United States Patent [19]

Gering

[11] Patent Number: 5,799,401

[45] Date of Patent: Sep. 1, 1998

[54] BAGEL DOUGH EXTRACTOR

[76] Inventor: George Gering, 8 Robins La., Short Hills, N.J. 07078

[21] Appl. No.: 850,491

[22] Filed: May 2, 1997

[51] Int. Cl.$^6$ .................................................... B26D 3/06
[52] U.S. Cl. ........................... 30/300; 30/113.2; 30/124
[58] Field of Search ............................. 30/299, 230, 301, 30/302, 314, 315, 317, 113.1, 113.2; 99/538, 542, 544, 547, 551, 552, 553

[56] References Cited

U.S. PATENT DOCUMENTS

| | | | |
|---|---|---|---|
| 1,454,311 | 5/1923 | Boyle | 30/113.2 |
| 1,669,960 | 5/1928 | Walsh | 30/113.2 |
| 4,979,419 | 12/1990 | Sonkin | 30/300 |
| 5,033,193 | 7/1991 | Valenti | 30/124 |
| 5,557,998 | 9/1996 | Schwartz et al. | 30/300 |

*Primary Examiner*—Hwei-Siu Payer
*Attorney, Agent, or Firm*—James & Franklin; Robert L. Epstein; Harold James

[57] ABSTRACT

An annular base carries a moveable cam member. Downwardly extending circumferentially arranged arcuate blades are mounted along the outer edge of the base to form a circle. Downwardly extending circumferentially arranged arcuate blades are pivotly mounted along the inner edge of the base to form a circle within the circle of fixed blades. Springs are interposed between radially aligned pairs of blades. The apparatus is positioned over the bagel such that the blades enter the interior of the bagel. The cam member cooperates with the moveable blades to move each blade in a substantially radial direction, against the intervening spring. The blades move from a position spaced from the aligned fixed blade to a position proximate to the aligned blade, as the cam member is moved, causing the dough to be pinched between the aligned blades. The dough is extracted as the apparatus is removed from the bagel.

29 Claims, 3 Drawing Sheets

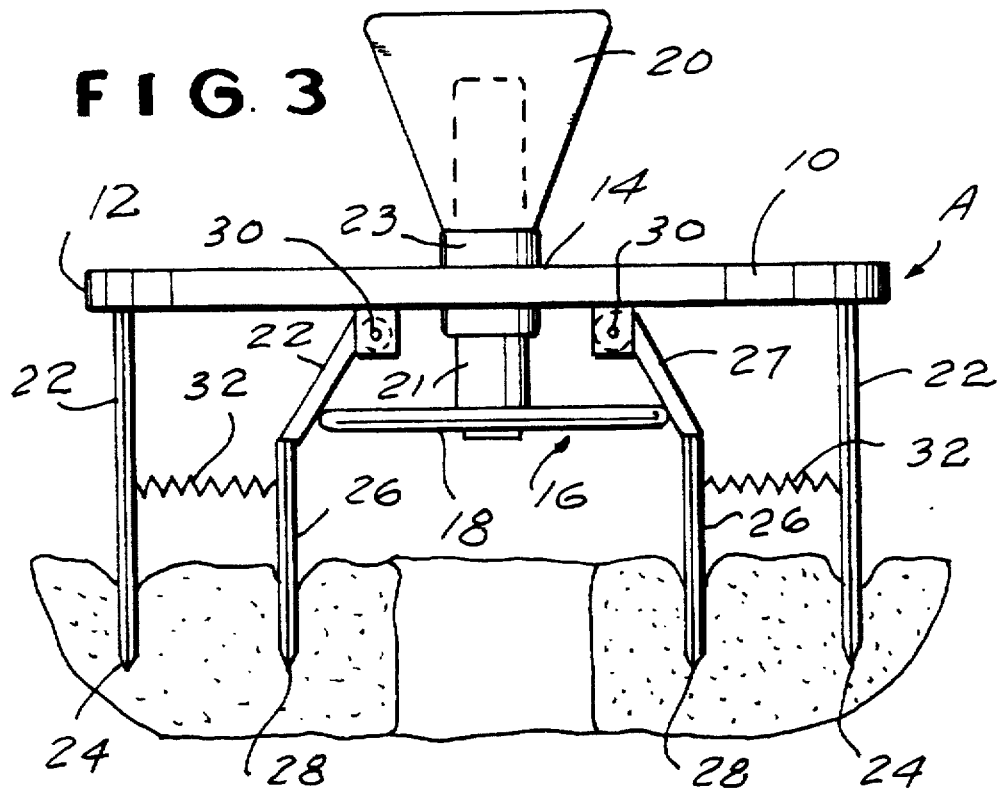
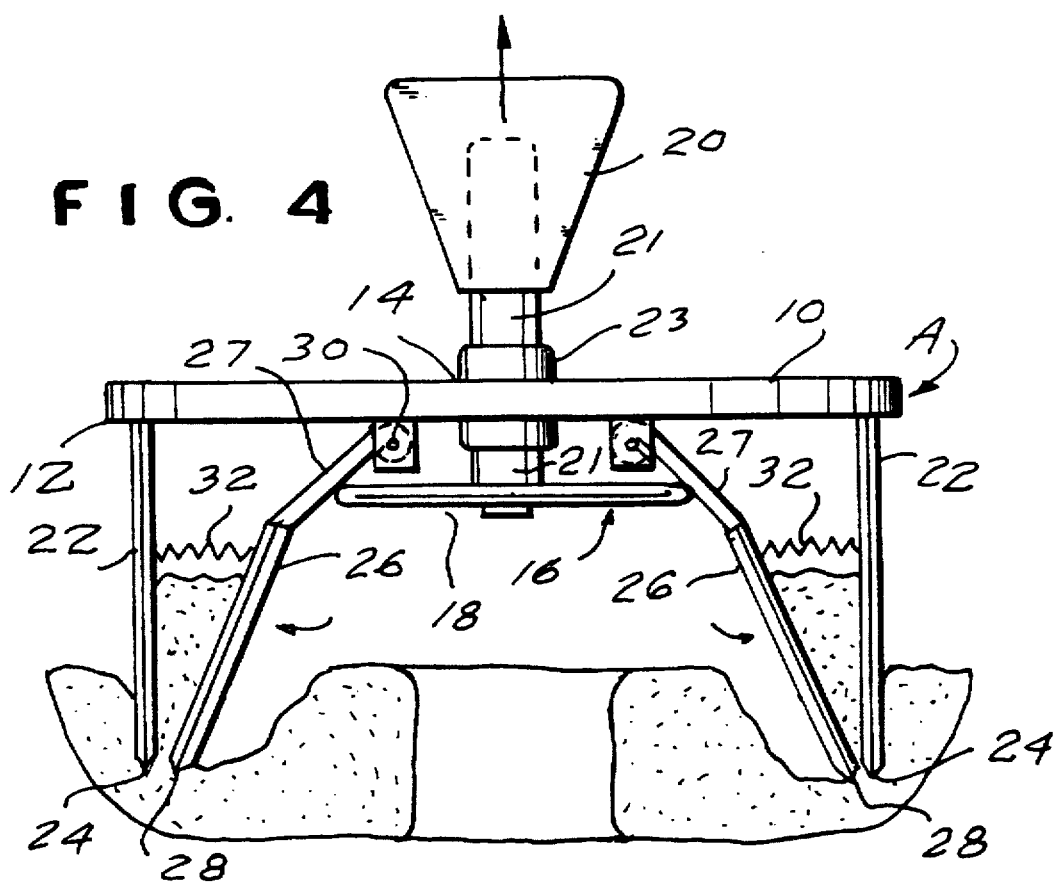

BAGEL DOUGH EXTRACTOR

The present invention relates to apparatus for extracting unwanted dough from the interior of a bagel and more particularly to a bagel dough extraction apparatus which utilizes a pinching action to quickly and uniformly extract the dough.

Bagels have become an increasingly popular bread product through this country and the world. However, bagels have a relatively high caloric content. It has therefore become the custom of many weight conscious individuals to remove a portion of the interior dough from the bagel, prior to its consumption.

After slicing the bagel in half, along a plane substantially perpendicular to the axis, each bagel half in turn can be held in one hand while the other hand is used to scoop out the unwanted dough. This is often done manually, either by the fingers alone or using a tool such as a spoon.

However, more elaborate apparatus has been developed for this purpose. For example, U.S. Pat. No. 4,979,419 issued Dec. 25, 1990 to Richard Sonkin entitled "Apparatus and Method for Treating Baked Goods" teaches a device with an outer ring including downwardly projecting pins which secured to the cut surface of a previously sliced bagel half. A cutting disc having an upwardly projecting handle and downwardly projecting cutting blades is provided to be rotated within the outer ring, which serves as a guide and as a bearing. By turning the cutting disc while maintaining the bagel and the outer ring stationary, a circular trough is cut in the dough of the bagel half by the cutting blades.

In an antomatic version of the Sonkin apparatus, a flat upwardly projecting screw is mounted in a base plate. The bagel half is secured by base plate mounted pins about the flat screw. A cutting disc is provided with a slot to receive the flat screw in a manner to automatically rotate the cutting disc relative to the bagel when the cutting disc is axially moved toward the base plate.

U.S. Pat. No. 5,033,193 issued Jul. 23, 1991 to Rose Valenti entitled "Bagel Scooper" describes a scooper including a holder having a substantially circular base, a wall extending vertically upwardly from the perimeter of the base and a gripper mounted on the base. The holder is adapted to receive the bagel, thereby preventing it from rotating. A rotor having a substantially circular bottom with a periphery fitting within the base rotates with respect to the base. A cutter blade is extends below the base, so that the blade is at the leading edge of the cutter as the rotor turns. The blade is arcuate, such that rotation of the rotor causes the blade to cut into the bagel and remove a portion thereof.

U.S. Pat. No. 5,557,998 issued Sep. 24, 1996 to Eli Schwartz et al. entitled "Bagel Coring Apparatus" discloses apparatus including a base member and a post member with a drive shaft guide structure. A drive shaft having a longitudinal axis is rotatably fitted through the guide structure. The drive shaft has external threads. A mechanism is provided for engaging the shaft external threads. Rotation of the drive shaft relative to the post member causes the drive shaft to advance along the longitudinal axis relative to the post member. A cutting element is mounted on the drive shaft. It has arched blades with blade cutting edges radially spaced from the drive shaft longitudinal axis for cutting along a circular path. A holding structure is connected to the mounting base and located within the longitudinal axis of the drive shaft and adjacent to the cutting element for securing the food item against rotation relative to the post member. The cutting element is advanced toward the holding structure and into contact with the food item by rotating the drive shaft.

Each of the above designs is relatively complex and relies upon the rotation of cutting blades to scoop the unwanted dough out of the bagel half. However, I have found that rotating blades do not perform this task easily and uniformly. Accordingly, I have adapted a different approach, eliminating the scooping action resulting from the rotation of blades altogether.

It is therefore a prime object of the present invention to prove a bagel dough extractor which is simple in design, easy to operate, inexpensive to fabricate and works reliably.

It is another object to the present invention to provide a bagel dough extractor which enables the user to quickly and uniformly extract unwanted dough.

It is another object of the present invention to provide a bagel dough extractor which does not rely upon rotating parts or employ a scooping action.

In accordance with one aspect of the present invention, apparatus for extracting dough from a bagel half is provided comprising a base and fixed blade means mounted on the base. Moveable blade means are mounted on the base for movement in a substantially radial direction, between a position remote from the fixed blade means and a position proximate the fixed blade means. Manually operable means, moveable relative to the base, are provided for moving the moveable blade means.

Spring means are provided for urging the moveable blade means towards the remote position.

The fixed blade means comprises a set of circumferentially arranged arcuate blades. The moveable blade means also comprises a circumferentially arranged set of arcuate blades. The moveable blade means are situated within the fixed blade means.

Each of the moveable blades is radially aligned with a different one of the fixed blades, to form a plurality of blade pairs. Spring means are asssociated with each of the blade pairs.

The base is substantially annular. It has an inner edge and an outer edge. The fixed blade means are mounted proximate the outer edge. The moveable blade means are mounted proximate the inner edge.

Means are provided for pivotly mounting the moveable blade means on the base. Cam means are adapted, when actuated, to cooperate with the moveable blade means to pivot the moveable blade means toward the fixed blade means.

The base carries the cam means in the form of a member mounted for relative movement. The cam means comprises a disk and grip means.

In accordance with another aspect of the present invention, apparatus for extracting dough from the bagel half is provided including an annular base with an inner edge and an outer edge. A cam member is mounted for movement relative to the base. Blade means are fixedly mounted to the base, proximate the outer edge thereof. A set of circumferentially arranged moveable arcuate blades are pivotly mounted to the base, proximate the inner edge thereof. Spring means are interposed between the fixed blade means and moveable blades. The cam member cooperates with the moveable blades to move each of the moveable blades in a substantially radial direction, against the urging of the spring means, from a position remote from the fixed blade means to a position proximate the fixed blade means, as the cam member is moved relative to the base.

To these and such other objects which may hereinafter appear, the present invention relates to a bagel dough extractor as set forth in the following specification and recited in the annexed claims, taken together with the

3 accompanying drawings, in which like numerals refer to like parts, and wherein

FIG. 3 is a cross-sectional view of the extractor situated in the bagel.

FIG. 4 is a view similar to FIG. 3 but showing the extractor in the actuated state:

Figure 1:
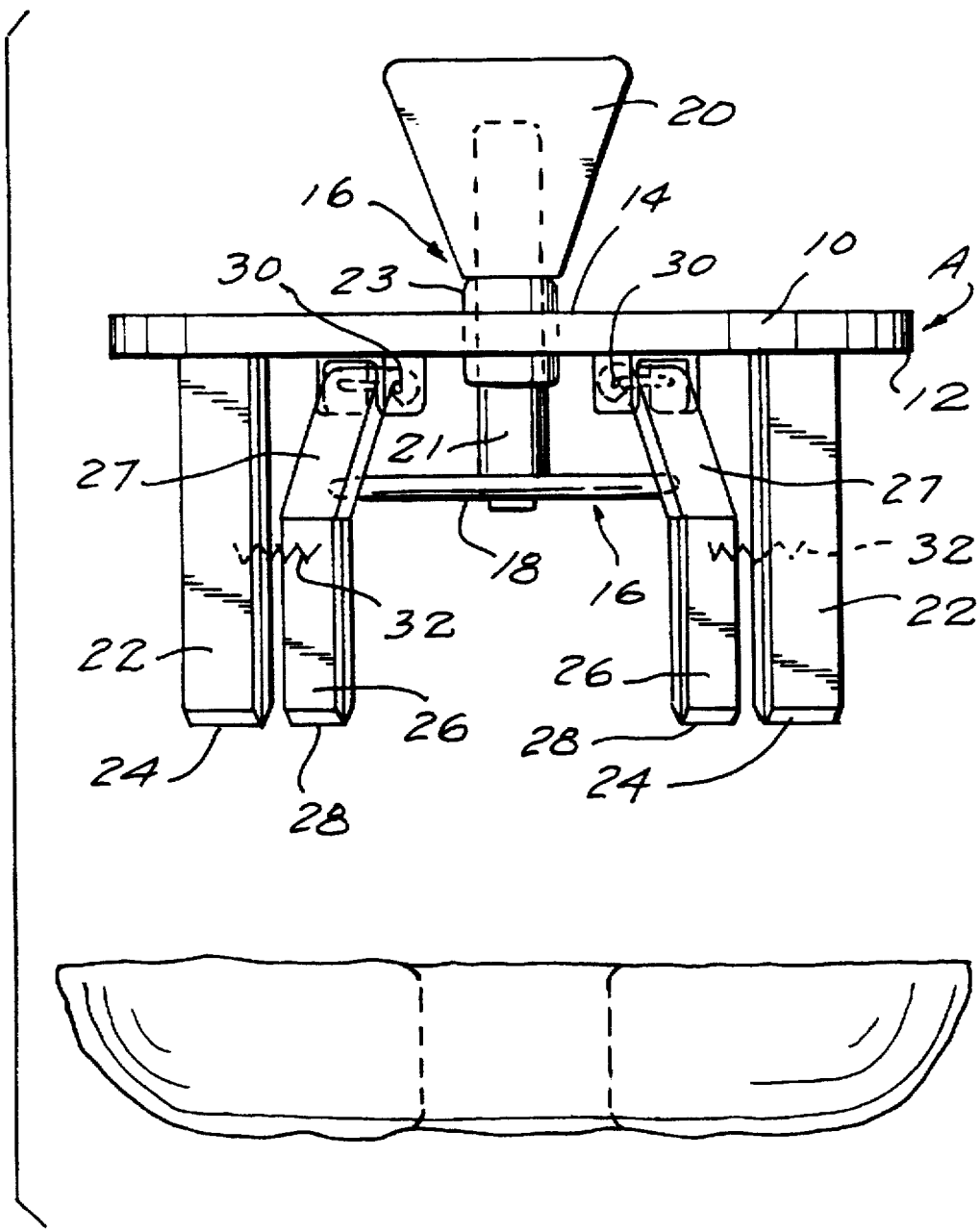
FIG. 1 is an exploded side view of the extractor of my invention and a bagel.
Figure 2:
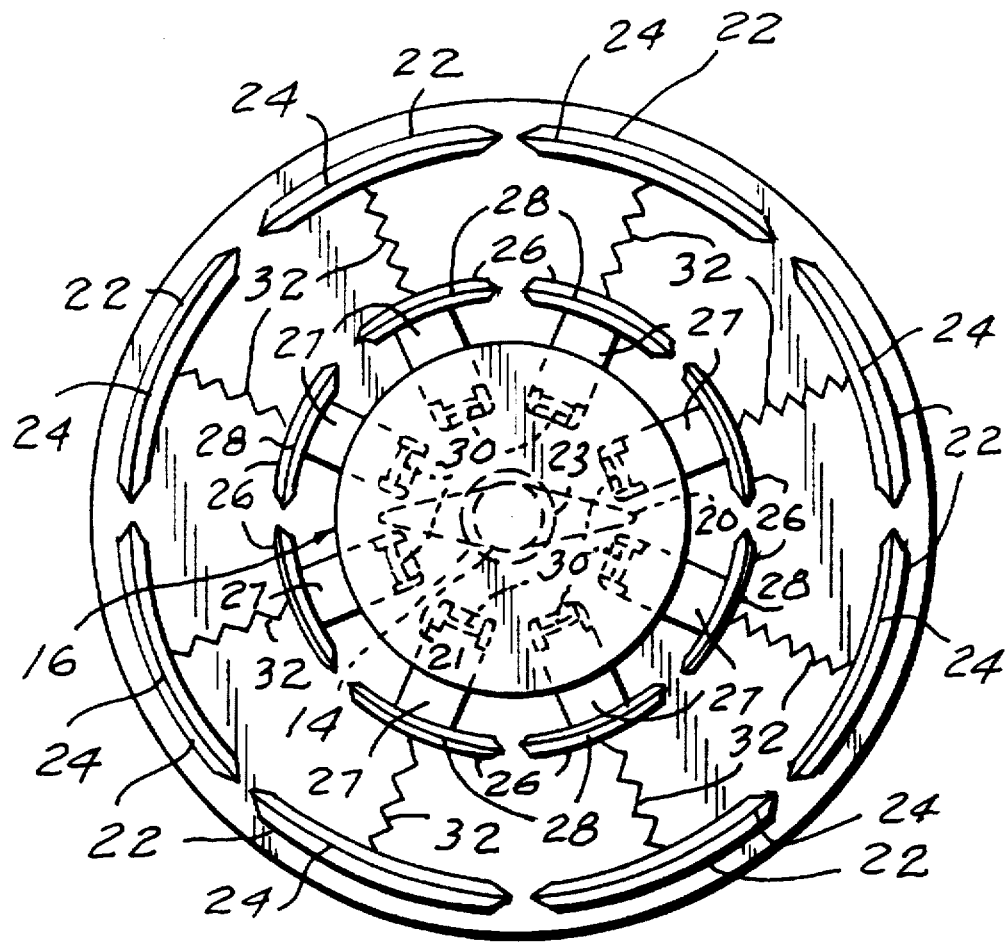
FIG. 2 is a bottom view of the extractor.

As shown in the drawings, the extractor, generally designated A, includes a base 10, substantially annular in configuration, with an outer edge 12 and an inner edge 14. Carried by base 10 and mounted for movement relative thereto, is a cam member 16 which consists of a disk 18 and a gripping part 20 connected to disk 18 by a shaft 21. Shaft 21 is moved through neck part 23 fixed within the centered opening in base 10 defined by inner edge 14.

Extending from the lower surface of base 10, proximate outer edge 12, are a set of fixed, circumferentially arranged arcuate blades 22. Each blade 22 has a relatively sharp lower edge 24 and is preferrably made of hardened spring steel.

Extending from the lower surface of base 10, proximate inner edge 14, are a set of pivotally mounted circumferentially arranged arcuate moveable blades 26. The cutting portion of each blade 26 has a relatively sharp lower edge 28 and is preferrably also made of hardened spring steel.

Each moveable blade 26 has an upper portion 27 which is situated at an obtuse angle with the plane of the cutting portion. The upper portion 27 of each blade 26 is connected to the lower surface of base 10 by a pivot 30.

The cutting portion of each blade 26 is radially aligned with a different one of the fixed blades 22 so as to form a blade pair. The blades in each pair are initially substantially parallel to each other (FIG. 3), approximately ⅝ inch apart. Interposed between each blade pair is a spring 32.

Pulling gripping part 20 of cam member 16 upwards, relative to neck part 23 affixed in the central opening of base 10, causes the edge of the disk 18 to cooperate with the interior surface of the inclined upper portion 27 of each moveable blade 26 to pivot the blade so as to move the blade from a position spaced from the aligned outer blade 22 (FIG. 3) toward a position where the end of the blade is proximate the aligned fixed blade (FIG. 4). Releasing the cam member allows springs 30 to move blades 22 back toward their original position.

Figure 5:
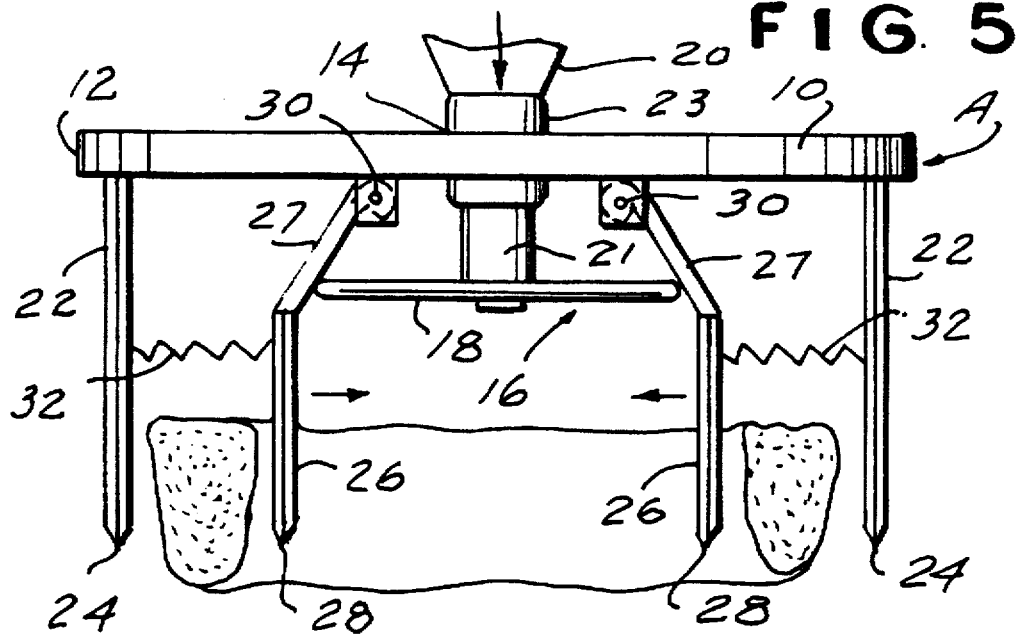
FIG. 5 is a cross-sectional view similar to FIG. 3 but showing the extractor after it has been removed from the bagel and the extracted dough is released.

The operation of the extractor is simple. The bagel is cut in half and half of the bagel is placed on a flat surface with the interior facing up. The apparatus of the present invention is situated directly over the bagel and moved downwardly such that blades 22 and 26 penetrate the dough in the interior of the bagel to the depth of approximately ½ inch. The user grips part 20 of cam member 16 and pulls it upwards relative to base 10. This causes the edge of disk 18 to bear against the surfaces of upper portions 27 of moveable blades 26 such that each blade 26 moves outwardly and sightly upwardly toward the aligned fixed blade 22, so as to "pinch" the dough therebetween. The upward movement of the blades 26 lifts the dough away from its base, compresses the dough and allows the dough to be pushed in a direction which is at a slightly elevated angle relative to a horizontal plane. The operator now holds the bagel as the apparatus is lifted from the bagel, bringing with it the compressed dough. The removed dough is released from the extractor as spring 32 urge the moveable blades toward this initial positions, as seen in FIG. 5.

4

It will now be apprecited that the present invention relates to a bagel dough extractor of relatively simple design capable of operating to quickly and uniformly removing unwanted dough from a bagel.

While only a single preferred embodiment of the invention has been disclosed for purposes of illustration, it is obvious that many variations and modifications could be made thereto. For example, fixed blades 22 could be replaced by a single continuous circular blade or the radial movement of the inner blades could be accomplished by twisting a gripping part to rotate a cam track, instead of by linear movement of the cam member. It is intended to cover all of these variations and modifications which fall within the scope of the invention, as defined by the following claims:

I claim:

1. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means and manually operable means, moveable relative to said base, for moving said moveable blade means between said positions, said fixed blade means comprising a set of fixed blades and said moveable blade means comprising a set of moveable blades and where each of moveable blades is radially aligned with a different one of said fixed blades to form a blade pair.

2. The apparatus of claim 1 further comprising spring means associated with each of said blade pairs.

3. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means, manually operable means, moveable relative to said base, for moving said moveable blade means between said positions, means for pivotly mounting said moveable blade means on said base, said manually operate means comprising cam means adapted when actuated to cooperate with said moveable blade means to move said moveable blade means towards said proximate position.

4. The apparatus of claim 3 wherein said cam means comprises a cam member mounted for relative movement.

5. The apparatus of claim 4 wherein said cam member comprises a disk.

6. The apparatus of claim 4 wherein said cam member comprises grip means.

7. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means and manually operable means, moveable relative to said base, for moving said moveable blade means between said positions, said fixed blade means comprising a set of spaced apart circumferentially arranged blades.

8. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means and manually operable means, moveable relative to said base, for moving said moveable blade means between said positions, said fixed blade means comprising a set of spaced apart circumferentially arranged arcuate blades.

9. Apparatus for extracting dough from a bagel half comprising a base, fixed blade means mounted on said base, moveable blade means mounted on said based for movement in a substantially radial direction, between a position relatively remote from said fixed blade means and a position proximate said fixed blade means and manually operable means, moveable relative to said base, for moving said moveable blade means between said positions, said moveable blade means comprising a set of spaced apart circumferentially arranged blades.

10. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means and manually operable means, moveable relative to said base, for moving said moveable blade means between said positions, said moveable blade means being substantially parallel to said fixed blade means in said remote position.

11. The apparatus of claim 10 further comprising spring means for urging said moveable blade means towards said remote position.

12. The apparatus of claim 10 wherein said fixed blade means comprises a set of circumferentially arranged blades.

13. The apparatus of claim 10 wherein said fixed blade means comprises an arcuate blade.

14. The apparatus of claim 10 wherein said fixed blade means comprises a set of circumferentially arranged arcuate blades.

15. The apparatus of claim 10 wherein said moveable blade means comprises a set of circumferentially arranged blades.

16. The apparatus of claim 10 wherein said moveable blade means comprises an arcuate blade.

17. The apparatus of claim 10 wherein said fixed blade means has a circular configuration and said moveable blade means is situated inside of said fixed blade means.

18. The apparatus of claim 10 wherein said fixed blade means comprises a set of fixed blades and said moveable blade means comprises a set of moveable blades and where each of moveable blades is radially aligned with a different one of said fixed blades to form a blade pair.

19. The apparatus of claim 18 further comprising spring means associated with each of said blade pairs.

20. The apparatus of claim 10 wherein said base is substantially annular, having an inner edge and an outer edge.

21. The apparatus of claim 20 wherein said fixed blade means is mounted proximate said outer edge of said base.

22. The apparatus of claim 20 wherein said moveable blade means is mounted proximate said inner edge of said base.

23. The apparatus of claim 10 further comprising means for pivotly mounting said moveable blade means on said base.

24. The apparatus of claim 23 wherein said manually operable means comprises cam means adapted when actuated to cooperate with said moveable blade means to move said moveable blade means towards said proximate position.

25. The apparatus of claim 24 wherein said cam means comprises a cam member mounted for relative movement.

26. The apparatus of claim 25 wherein said cam member comprises a disk.

27. The apparatus of claim 25 wherein said cam member comprises grip means.

28. Apparatus for extracting dough from a bagel half comprising an annular base with an inner edge and an outer edge, a cam member mounted for movement relative to said base, blade means fixedly mounted to said base, proximate said outer edge thereof, a set of circumferentially arranged moveable arcute blades pivotly mounted to said base, proximate said inner edge thereof, spring means interposed between said fixed blade means and said moveable blades, said cam member cooperating with said moveable blades to move each of said moveable blades in a substantially radial direction, against the urging of said spring means, from a position remote from said fixed blade means to a position proximate said fixed blade means, as said cam member is moved relative to said base.

29. Apparatus for extracting dough from a bagel half comprising a base, fixed blade means mounted on said base, moveable blade means mounted on said base for movement in a substantially radial direction, between a position relatively remote from said fixed blade means and a position proximate said fixed blade means, manually operable means, moveable relative to said base, for moving said moveable blade means between said positions and spring means for urging said moveable blade means toward said remote position.

* * * * *